May 29, 1962 S. T. CARTER 3,036,624
ARTICLE FEEDING APPARATUS FOR PROCESSING MACHINE
Filed Oct. 1, 1959
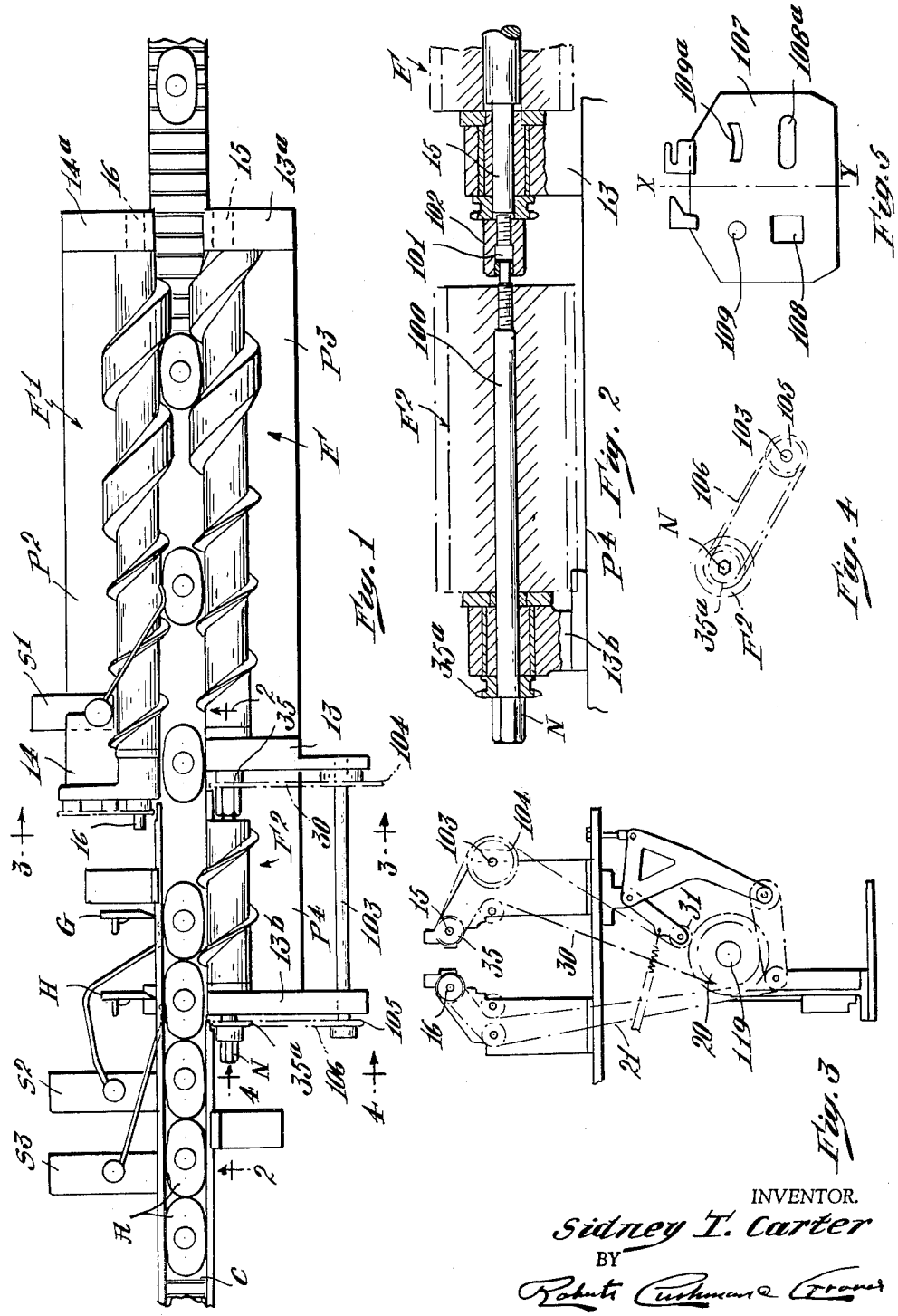
INVENTOR.
Sidney T. Carter
BY
Roberts Cushman & Grant
ATT'YS

United States Patent Office 3,036,624
Patented May 29, 1962

3,036,624
ARTICLE FEEDING APPARATUS FOR
PROCESSING MACHINE
Sidney T. Carter, Shrewsbury, Mass., assignor to Geo. J. Meyer Manufacturing Co., Cudahy, Wis., a corporation of Wisconsin
Filed Oct. 1, 1959, Ser. No. 843,801
3 Claims. (Cl. 156—566)

This invention pertains to conveyor apparatus of that type which is customarily employed for feeding bottles, jars or other substantially rigid containers to processing apparatus, for example, to a bottle filling machine, bottle capping machine or labeling machine, and relates more especially to conveyor apparatus of the so-called "straight-away" type wherein the articles are moved one after another in tandem relation along a substantially rectilinear path while resting upon a conveyor run of a kind which permits substantially free movement of the article transversely of said path except as such movement is limited by guide rails or the like at opposite sides of said path, and in which the articles are delivered to the processing mechanism in definitely spaced relation by a rotating helix.

Conveyor apparatus of the above general type is disclosed by way of example in the copending application for Letters Patent of the United States, Serial No. 551,012, filed December 5, 1955, by Sidney T. Carter, upon which Patent No. 2,940,630, issued on June 14, 1960. In the machine disclosed in said copending application the conveyor is arranged to deliver articles to a labeling machine so designed as to be capable of applying labels simultaneously to three bottles as the bottles move uninterruptedly along the conveyor path. For that particular purpose the machine comprises three label holders, three sets of pickers, three sets of grip fingers, and three double sets of wipers (at each side of the conveyor path if labels are to be applied to opposite sides of the same article). The articles are delivered into the field of action of the label-applying devices by means of a helix, whose axis is parallel to said path and which makes three complete turns for each cycle of operation of the machine as a whole.

While, as disclosed in the aforesaid application, the machine is set up to apply labels simultaneously to three bottles, the same machine with slight alterations may be set up to apply labels to any desired number of bottles simultaneously by appropriately changing the number of label magazines, picker sets, grip fingers and wiper sets, which are hereinafter, for convenience, referred to collectively as the "labeling attachments." While the machine is designed to operate at a very high speed while applying a multiple of labels simultaneously, for example at a speed of 300 articles per minute, it has provision for reducing its speed so that it is readily capable of applying labels to a lesser number of articles per minute (for example, but one article per cycle), if a relatively small number of articles are required to be processed per unit of time, all of this upon the assumption that the articles to be processed are all alike so that the same labeling attachments may be used. However, in order to adapt the machine to apply labels to articles of a different size or shape, it is necessary to substitute a new, complete set of label attachments, an operation which involves substantial expense and labor cost. If in a given instance it be required that a machine which ordinarily processes three articles, of a given kind, per cycle and, at its maximum capacity processes 300 articles per minute, be set up to process articles of another kind, but in relatively small numbers, for example, one hundred per minute, the machine may be run at low speed, for example, its speed may be reduced one-third to correspond to the desired capacity of output and thus take care of the smaller desired production, but since the machine is set up to process three articles per cycle and has a corresponding number of sets of attachments, the change over, to accommodate it to the new kind of article (still labeling three articles per cycle), requires the removal of all of the old attachments and their replacement by a full set of attachments appropriate to the new articles. This may be such an expensive operation as to make it unjustifiable in relation to the small number of articles to be processed.

The present invention has for an object the provision of auxiliary feed means, applicable to a machine of the above type whereby the machine may be converted for operation at substantially less than its maximum capacity and for processing articles different from those which it ordinarily handles at full capacity, without necessitating the substitution of a full set of labeling attachments appropriate for processing the new article. As a further and more specific illustration, if the machine be ordinarily required to process 400 articles per minute with a set of attachments designed to process four articles during each cycle of operation, and if it now be desired to process but 200 articles of a different kind per minute, the present invention provides for advancing but 200 articles per minute into the field of action of the processing attachments, although the machine as a whole may be running at full capacity, and thus, instead of having to substitute a full set of attachments capable of handling 400 articles per minute, it becomes necessary to supply only one-half the normal number of processing attachments in order to process two articles during each cycle.

In the attainment of the above object the present invention provides for modification of a machine of the general type above described by the installation of an auxiliary feed or transfer helix which is driven at an angular velocity ratio different from that of the main helix, for example, at a ratio of one-to-two or a ratio of one-to-four, and which is thus operative to deliver the articles to be processed into the receiving end of the main helix so that successive articles will be spaced further apart than normal along the main helix and delivered into the field of action of the label-applying attachments in such spaced relation that, for example, two only or but one only will be presented for the reception of labels during each cycle of the machine. Thus only one-half or one-fourth the normal number of new label-magazines, etc., to process the new kind of article is required.

A further object of the invention is to make possible the use of a machine such as above described for processing articles of one kind at full production capacity and also for processing articles of two other, distinct kinds, each at half capacity production, by providing the machine for processing said two distinct kinds of articles with duplex labeling attachments and then, by adjusting the auxiliary feed helix, so disposing articles of one of said kinds within the spire of the main helix that they will be presented to one of the duplex attachments, and that for processing the other kind of article, the feed helix will be so adjusted as to dispose the latter articles within the spire of the main helix so as to be operatively positioned relatively to the other of the duplex attachments.

A further object is to provide a simple auxiliary feed or transfer mechanism readily applicable to a machine of the above general type without extensive modification of the latter, and at a cost such as to make practical the conversion of the machine from full capacity to a lower capacity.

Other and further objects and advantages of the invention will be pointed out in the following more detailed description and by reference to the accompanying drawings, wherein, FIG. 1 is a fragmentary plan view showing auxiliary feed mechanism according to the present invention comprising means for so delivering articles to a constantly turning main feed helix that successive articles are spaced apart twice as far on the main helix as they would be were the main helix loaded to full capacity;

FIG. 2 is a fragmentary diagrammatic vertical section in the plane of the axis of the main helix and to larger scale than FIG. 1, showing the auxiliary feed helix and the bearings for its shaft;

FIG. 3 is a fragmentary end elevation partly in section on the line 3—3 of FIG. 1, showing the means for driving the auxiliary feed helix;

FIG. 4 is a fragmentary diagrammatic section on the line 4—4 of FIG. 1; and

FIG. 5 is a diagrammatic view illustrating the base plate of a duplex label holder designed to hold labels for labeling articles of two different kinds.

As above noted, the present invention is very useful in a labeling machine of the kind more fully illustrated and described in Letters Patent of the United States, No. 2,940,630, issued to Sidney T. Carter, on June 14, 1960, for ease in description it is here described and illustrated as embodied in the labeling machine more fully disclosed in the patent to Carter, No. 2,890,787, dated June 16, 1959. In that patent two parallel feed helices F and $F^1$ are shown, the helix F being herein referred to as the "main or spacer" helix. These helices are carried by parallel shafts 15 and 16 respectively carried by the removably mounted, substantially horizontal supporting plates P and $P^1$. The present machine comprises a conveyor C which moves the articles A, for example bottles, to be labeled along a predetermined rectilinear path so that the advancing articles are delivered into the space between the two helices F and $F^1$. In machines of the type in which the conveyor moves the articles uninterruptedly along the conveyor path and into the field of action of labeling devices (not herein shown), suitable fixed guide rails are provided where necessary to confine the articles to the intended path. In the machine of the present invention the plate P of the patent to Carter, No. 2,890,787, is replaced by a plate $P^3$ having an extension $P^4$ beyond the bearing 13, which provides an outboard bearing 13b, which receives one end of a shaft 100 (FIG. 2) upon which is mounted an auxiliary feed or transfer helix $F^2$ of the same pitch as the receiving end of the main helix F. The opposite end of the shaft 100 is journaled in an axial socket 101 in a nut 102 which is threaded to the shaft 15 of the main feed helix F and which secures a sprocket wheel 35 to said shaft, thus the auxiliary helix $F^2$ is coaxial with the main helix F.

The helices F and $F^1$ may be driven in substantially the same way as the helices shown in Patent 2,890,787, and as illustrated in FIG. 8 of that patent. This drive means, as here illustrated (FIG. 3), receives its power from the main drive shaft 119 of the machine, this drive shaft turning once for each cycle of operation and carrying the necessary cams and other elements (not here shown) for actuating the various elements of the labeling machine with which the feed mechanism of the present invention is associated. A sprocket wheel 20 on the shaft 119 drives endless sprocket chains 21 and 30 which, after passing about suitable guide sprockets, embrace sprockets on the shafts 16 and 15 and thus drive the helices F and $F^1$ at the same angular velocity, but in opposite directions. Assuming that $x$ represents the number of articels to be labeled per cycle, then $$\frac{\text{Pitch diameter of 20}}{\text{Pitch diameter of 16}} = \frac{x}{1}$$

For driving the shaft 100 of the auxiliary helix $F^2$ a jack shaft 103 is provided, this jack shaft being journaled at its opposite ends in the bearings 13 and 13b and having mounted upon it a sprocket wheel 104 (FIGS. 1 and 3) about which the chain 30 passes. This sprocket wheel 104 is interchangeable, being so mounted upon the shaft 103 that it may be removed readily and replaced by another of a different size, and bears a definite diameter relation to the sprocket wheel 35 on the shaft of the main helix F. For example, it may be twice the size of the sprocket 35, or it may be four times the size of the sprocket 35. At its other end the shaft 103 carries a sprocket 105 (FIG. 4) about which is trained an endless sprocket chain 106 which embraces sprocket wheel 35a adjustably secured to the shaft 100 by a nut N. By loosening the nut, the sprocket 35a may be turned relatively to shaft 100 and then the helix $F^2$ may be initially oriented relatively to helix F, so as to predetermine the time in the revolution of the latter at which an article will be presented to the helix F. Desirably the sprocket wheels 105 and 35a are of the same diameter.

The assembly, including the plate $P^3$ with its extension $P^4$ and the jack shaft 103, and the means for driving the latter constitutes an attachment which may be applied without difficulty to a machine such as that of the above U.S. Letters Patent, No. 2,940,630 or the machine of the Patent 2,890,787 above referred to. Feeler actuated switches $S^1$, $S^2$ and $S^3$ may be provided, as in the machines of the above patents, Nos. 2,890,787 or 2,940,630, for controlling the operation of the machine in such a way as to insure a constant supply of articles so long as the machine is running, and likewise movable stop members H and/or G may be provided, as is conventional in machines of this general type so as to insure the proper timing of the leading article in advancing toward the feed helices.

If it be assumed that the feed mechanism of the present invention is to be associated with a labeling machine of the kind designed to label four bottles per cycle while running at high speed, for example, at a speed such as to label 320 bottles per minute, it is obvious that the labeling machine must be provided with label magazines, grip fingers, pickers and wipers in sets of four so that four labels may be applied simultaneously. If now it be required that the labeling machine be adapted to apply labels of a different kind or label articles differently shaped or dimensioned, and in a much smaller number, for example, that the required capacity is only 160 bottles per minute, but remembering that for proper operation of certain parts of the labeling machine it is substantially necessary to keep the main shaft running at the maximum speed and the conveyor advancing articles at the normal rate, it would now be necessary, normally, to provide four new magazines, four new grip fingers, etc., for applying the differently shaped labels to the differently shaped articles. However, in accordance with the present invention, if the sprocket wheel 104 be made of a pitch diameter twice that of the sprocket wheel 35, then the auxiliary feed helix $F^2$ will turn at an angular velocity one-half that of the main feed helix F. Thus, as the articles A are advanced by the feed helix $F^2$, they will be spaced apart a distance twice as great on the main helix F as they normally would be if they were fed directly to the main helix F, leaving alternate turns of the groove of the helix empty, and thus, although only one-half the number of articles per minute are being advanced by the machine whose main shaft is still running at maximum velocity, it is only necessary to provide two new sets of magazines, grip fingers, etc. as compared with the four new sets which would be required if the auxiliary feed helices were not provided.

The machine has the further capacity to label half the normal number of articles per minute of each of two different kinds by the provision of duplex label magazines, grip fingers, etc., each of such duplex attachments being specifically designed for use with one respectively of these two different kinds of articles. For example, in FIG. 5, the base plate of such a duplex label magazine is diagrammatically illustrated at 107, this duplex plate having apertures 108 and 109 defining the lower ends of magazine compartments for body and neck labels, respectively located at one side of the center line X—Y and differently shaped openings 108a and 109a at opposite sides of said line for holding body and neck labels of different shapes.

Assuming that two such duplex magazines and corresponding duplex grip fingers, etc., are provided, and that the auxiliary helix F² is driven at half the angular velocity of the main helix F, it is possible by properly adjusting the sprocket wheel 35a on the shaft 100 of the auxiliary feed helix F² to orient the helix F² relatively to the shaft 15 of the main helix F so that it will so present articles of one kind to the main helix F that they will arrive at the proper time to receive labels from the magazine compartments 108 and 109 and likewise be properly presented to the other labeling elements. Then when the machine is to be used for applying labels of a different shape or to articles of a different type, sprocket wheel 35a on the shaft of the auxiliary feed helix F² will be adjusted, for example, through 180°, so as initially to orient helix F² relatively to the helix F that articles will enter the groove of the helix F at a different point lengthwise of the latter and will arrive at the proper position to receive labels from the label compartments 108a and 109a. Thus the present arrangement provides for further economy in a labeling plant where labels of a variety of kinds or sizes are handled and in quantities insufficient to make it practical to provide a separate labeling machine or feed apparatus for each variety.

It is obvious that by changing the ratio of the sprocket wheel 104 to the sprocket wheel 35, almost any desired spacing of the articles as they are delivered into the feed helix F may be obtained (including the filling of every turn of the groove of the helix) and thus a great variety of conditions may be met satisfactorily by the employment of this simple attachment.

While one desirable embodiment of the invention has herein been disclosed by way of example, it is to be understood that the invention is broadly inclusive of any and all modifications falling within the terms of the appended claims.

I claim:

1. In combination with a main feed mechanism comprising a rotatable spacer helix for advancing articles into the field of action of a processing machine, a drive shaft which turns once for each cycle of operation of the processing machine, motion-transmitting connections between the drive shaft and the spacer helix operative to turn the latter at a constant predetermined normal number of revolutions per cycle and a conveyor capable of supplying articles to the helix at a rate such as would fill every turn of the groove of the helix when the latter is rotating at normal speed, an auxiliary helix coaxial with and of the same pitch as the receiving end of the spacer helix operative to deliver articles to the spacer helix, a shaft on which the auxiliary helix is mounted, and driving connections including speed-reducing means adjustable to drive the auxiliary helix at a selected angular velocity which is a predetermined aliquot part of that of the spacer helix.

2. Feed mechanism for use with a labeling machine comprising a duplex label magazine having compartments designed to hold labels of different kinds respectively, said feed mechanism including a conveyor moving at constant velocity for delivering articles to be labeled to the labeling machine and also comprising a rotatable spacer helix and means operative to rotate said helix a constant predetermined number of turns for each cycle of the labeling machine, and, in combination therewith, an adjustable auxiliary helix, coaxial with the spacer helix, adjustable means for turning said auxiliary helix at a selected predetermined angular velocity, relatively to that of the spacer helix, so that articles will be delivered to the spacer helix, in such relation to the latter, that they will receive labels alternatively from one or the other, respectively, of said magazine compartments.

3. Feed mechanism for use with a labeling machine comprising a duplex label magazine having label compartments designed to hold labels of different kinds respectively, said feed mechanism including a conveyor moving at constant velocity for delivering articles to be labeled to the labeling machine and also comprising a rotatable spacer helix and means operative to rotate said helix a constant predetermined number of turns for each cycle of the labeling machine, and, in combination therewith, an auxiliary helix coaxial with the spacer helix, a shaft on which the auxiliary helix is mounted, a sprocket wheel on said shaft, connections including an endless sprocket chain, embracing said sprocket wheel for turning the auxiliary helix in predetermined angular relation to the spacer helix, and means for adjusting the sprocket relatively to the shaft of the auxiliary helix thereby to permit initial orientation of the auxiliary helix relatively to the spacer helix.

References Cited in the file of this patent

UNITED STATES PATENTS

| | | |
|---|---|---|
| 2,692,671 | Day et al. | Oct. 26, 1954 |
| 2,886,200 | Thulke et al. | May 12, 1959 |
| 2,890,787 | Carter | June 16, 1959 |